US007101415B2

(12) United States Patent
Torres, Jr. et al.

(10) Patent No.: US 7,101,415 B2
(45) Date of Patent: Sep. 5, 2006

(54) METHODS FOR REGENERATING PROCESS GAS PURIFIER MATERIALS

(75) Inventors: Robert Torres, Jr., Parker, CO (US); Joseph Vivinski, Denver, CO (US); David Lawrence, Inverness, IL (US)

(73) Assignee: Matheson Tri-Gas, Inc., Longmont, CO (US)

( * ) Notice: Subject to any disclaimer, the term of this patent is extended or adjusted under 35 U.S.C. 154(b) by 62 days.

(21) Appl. No.: 10/651,644

(22) Filed: Aug. 28, 2003

(65) Prior Publication Data

US 2004/0123736 A1   Jul. 1, 2004

Related U.S. Application Data

(60) Provisional application No. 60/407,124, filed on Aug. 30, 2002.

(51) Int. Cl.
*B01D 53/04* (2006.01)
(52) U.S. Cl. .............................. 95/115; 95/116; 95/120; 95/123; 95/126; 95/129; 95/133; 95/138; 95/139; 95/140
(58) Field of Classification Search ............. 95/97–99, 95/104–106, 115, 116, 120–126, 128, 129, 95/133, 138, 139, 140
See application file for complete search history.

(56) References Cited

U.S. PATENT DOCUMENTS

| | | | | | |
|---|---|---|---|---|---|
| 2,629,460 | A | * | 2/1953 | Maki | 95/105 |
| 2,747,681 | A | * | 5/1956 | Schuftan et al. | 96/122 |
| 3,130,021 | A | * | 4/1964 | Milton | 95/120 |
| 3,241,294 | A | * | 3/1966 | Walker et al. | 95/17 |
| 3,445,990 | A | * | 5/1969 | Hays et al. | 95/105 |
| 3,531,916 | A | * | 10/1970 | Kulperger et al. | 95/124 |
| 3,594,984 | A | * | 7/1971 | Toyama et al. | 95/126 |
| 3,728,844 | A | * | 4/1973 | Snyder et al. | 95/125 |
| 4,233,038 | A | * | 11/1980 | Tao | 95/104 |
| 4,259,320 | A | | 3/1981 | De Lay | |
| 4,331,456 | A | * | 5/1982 | Schwartz et al. | 95/93 |
| 4,579,723 | A | | 4/1986 | Weltmer et al. | |
| 4,636,225 | A | * | 1/1987 | Klein et al. | 95/120 |
| 4,698,073 | A | * | 10/1987 | Rohde et al. | 95/123 |
| 4,726,818 | A | * | 2/1988 | Yeung et al. | 95/124 |
| 4,770,676 | A | * | 9/1988 | Sircar et al. | 95/99 |
| 5,080,875 | A | | 1/1992 | Bernauer | |
| 5,298,054 | A | * | 3/1994 | Malik | 95/99 |
| 5,486,227 | A | * | 1/1996 | Kumar et al. | 95/41 |
| 5,571,309 | A | * | 11/1996 | Kumar | 95/99 |
| 5,647,891 | A | * | 7/1997 | Blizzard et al. | 95/99 |

(Continued)

*Primary Examiner*—Frank M. Lawrence
(74) *Attorney, Agent, or Firm*—Townsend and Townsend and Crew LLP

(57) ABSTRACT

A continuous method of producing a process fluid gas from a feed stream that includes the process fluid and impurities. The method includes: (a) providing a first and second vessel, each vessel containing one or more regenerable purifier materials for removing at least one of the impurities from the feed stream; (b) removing at least one of the impurities by passing the feed stream through one or the other of the vessels to provide a purified process fluid gas, with the vessel being maintained at a first temperature during the removal of impurities; and (c) regenerating the purifier materials in the vessels at a second temperature and during the time when it is not purifying the feed stream by flowing a portion of the purified process fluid or the feed stream or a separate source of the process fluid gas therethrough.

37 Claims, 9 Drawing Sheets

U.S. PATENT DOCUMENTS

| | | | |
|---|---|---|---|
| 5,779,768 A * | 7/1998 | Anand et al. | 95/99 |
| 5,833,738 A | 11/1998 | Carrea et al. | |
| 5,846,295 A * | 12/1998 | Kalbassi et al. | 95/105 |
| 5,902,561 A | 5/1999 | Carrea et al. | |
| 5,914,455 A * | 6/1999 | Jain et al. | 95/96 |
| 6,065,306 A | 5/2000 | Ji et al. | |
| 6,106,593 A * | 8/2000 | Golden et al. | 95/120 |
| 6,120,581 A * | 9/2000 | Markovs et al. | 95/99 |
| 6,221,130 B1 * | 4/2001 | Kolodziej et al. | 95/41 |
| 6,361,696 B1 | 3/2002 | Spiegelman et al. | |
| 6,402,809 B1 * | 6/2002 | Monereau et al. | 95/14 |
| 6,524,544 B1 | 2/2003 | Alvarez, Jr. et al. | |
| 6,576,044 B1 * | 6/2003 | Ho et al. | 95/102 |
| 2002/0128148 A1 | 9/2002 | Alvarez, Jr. et al. | |
| 2002/0134234 A1 * | 9/2002 | Kalbassi et al. | 95/11 |
| 2004/0173095 A1 * | 9/2004 | Vierling | 95/99 |

\* cited by examiner

METHODS FOR REGENERATING PROCESS GAS PURIFIER MATERIALS

CROSS-REFERENCE TO RELATED APPLICATIONS

This application claims priority to U.S. Provisional Application Ser. No. 60/407,124, filed Aug. 30, 2002, entitled "Methods for Regenerating Process Fluid Purifier Materials," which is incorporated herein by reference in its entirety.

BACKGROUND OF THE INVENTION

1. Field of the Invention

This invention relates generally to fluid purification systems, and more particularly to methods of regenerating purifier materials used in process fluid purification systems.

2. Description of the Prior Art

The provision of high purity gas streams is critically important in a wide variety of industrial and research applications. The rapid expansion of vapor-phase processing techniques, e.g. chemical vapor deposition, in the semiconductor industry has been associated with the deployment and use of manufacturing equipment that is totally reliant on the delivery of ultra-high purity process gases at the point of use in the semiconductor manufacturing facility.

Fluid purification systems are used to remove impurities from contaminated or otherwise impure fluids for the production of high purity process gases. The fluids may be liquid and/or gaseous, and are typically purified to provide a high quality fluid source for manufacturing or consumption purposes, or to remove toxins and other contaminants prior to the disposal of the fluid. Such systems usually include "consumables" such as filters or getters, which must be periodically replaced. For example, ammonia is a process gas that is very important in the semiconductor industry for the formation of nitride layers in electronic transistors through chemical vapor deposition and epitaxy processes. More specifically, ammonia is commonly used for the formation of silicon nitride and silicon oxynitride films by direct nitridation of silicon oxide. Growing films of silicon nitride and silicon oxynitride requires ammonia of very high purity. Ammonia is also used in the production of compound semiconductors such as GaN, AlGaN, GaInN, etc. Oxygen is a particularly harmful contaminant because its high chemical reactivity leads to its incorporation as an impurity into films during thermal nitridation of silicon oxide or during the production of GaN and GaAlN semiconductors. Since the manufacturing of GaN films requires very large amounts of ammonia during the processing steps, new methods of ammonia purification are required to reduce the cost of manufacturing wafers in the GaN process. Regenerable purifiers are also becoming more important as the cost of ownership becomes a more critical parameter.

Because gas purifier materials tend to be expensive, semiconductor manufacturers want to get as much use out of them as possible before they are replaced. However, semiconductor manufacturers tend to err on the side of conservatism, since using a gas purifier material past its allotted lifetime can result in inadequate gas purification and a possible contamination of a semiconductor manufacturing process utilizing the impure gas, which can be considerably more costly than the cost of replacing a gas purifier vessel.

Gas purifiers working on sorption of impurities mainly belong to two categories: getter-based purifiers and catalyst-based purifiers. Getter-based purifiers operate using the chemisorption principle, that is, non-reversible sorption, so that once the purifier is exhausted it must be replaced. In these systems, getter materials are encased in stainless steel columns and are either used at room temperature or are heated to a temperature in the range of 300° C.–450° C. Impurities from gases flowing through a getter column are trapped by the getter materials, thereby providing a purified gas at the outlet of the getter column. For the most part, the gettering process is not reversible, resulting in the eventual saturation of the gas purifier material with the impurities. Therefore, getter-type materials have a finite "life-time," making the getter columns a "consumable" item. The getter columns contain substantial quantities of expensive getter material and have a finite useful lifetime. The actual period of time that the getter column lasts depends upon the type and amount of impurities, the flow rate of the gas, the duration and frequency of the gas flow, and a number of environmental factors.

Another type of gas purifier system utilizes catalyst-based purifiers that operate by a physisorption principle. These purifiers may be regenerated by thermal or chemical treatment once exhausted.

Current gas purification systems typically comprise at least two purifier vessels for continuous operation, in addition to heating units, switching manifolds, and electronics modules. During purification, one purifier vessel is on-line for purifying a bulk gas. Before this purifier vessel becomes saturated with contaminants, the second purifier vessel is put on-line and the first purifier vessel is regenerated. One method of performing the regeneration process is by heating the purifier vessel and flowing a reactivation gas through the spent purifier material. After regeneration, the purifier bed is cooled and purged and is then ready to purify the bulk gas. Typical systems use hydrogen and/or nitrogen for the regeneration process, each requiring regeneration process gas connections and vent lines.

SUMMARY OF THE INVENTION

The present invention provides an efficient and cost-effective method for regenerating a process fluid purifier material. More specifically, one embodiment of this invention provides a method of regenerating a process fluid purifier material comprising flowing said process fluid through said purifier material while heating said purifier material to a temperature of at least 50° C. but below a temperature that degrades said purifier material. The process fluid can be a purified or unpurified form of the process fluid.

This invention further provides continuous methods of purifying a process fluid. More specifically, one embodiment of this invention provides a continuous method of producing a purified process fluid other than hydrogen or ammonia from a feed stream comprising said process fluid and one or more impurities, said method comprising:

(a) providing a first and second vessel, each vessel containing one or more regenerable purifier materials for removing at least one of said impurities from said feed stream;

(b) removing at least one of said impurities by passing said feed stream through one or the other of said vessels to provide said purified process fluid, said vessel being maintained at a first temperature during said removal of said at least one of said impurities; and (c) regenerating said one or more purifier materials in each of said vessels at a second temperature and during a time when it is not purifying said feed stream, said regeneration comprising flowing (i) a portion of said purified process fluid or (ii) said feed stream or (iii) a separate purified or unpurified source of said process fluid therethrough. The second temperature is a temperature sufficient to regenerate the purifier materials. In one embodiment the second temperature is at least 50° C. but below a temperature that degrades said purifier materials.

This invention further provides a continuous method of producing a purified process fluid other than hydrogen from a feed stream comprising said process fluid and one or more impurities, said method comprising:

(a) providing a first and second vessel, each vessel containing one or more regenerable purifier materials for removing at least one of said impurities from said feed stream;

(b) removing at least one of said impurities by passing said feed stream through one or the other of said vessels to provide said purified process fluid, said vessel being maintained at a first temperature during said removal of said at least one of said impurities; and (c) regenerating said one or more purifier materials in each of said vessels at a second temperature and during a time when it is not purifying said feed stream by flowing a portion of said purified process fluid or said feed stream or a separate source of said process fluid therethrough, provided that when the process fluid is ammonia, the second temperature used during regeneration is one that will decompose less than 4% or greater that 11% of the portion of purified ammonia within the vessel containing the purifier material being regenerated. Accordingly, the need for a separate means for cracking ammonia externally from the vessel being purified is not required in the methods of this invention.

This invention further provides a continuous method of producing a purified process fluid other than hydrogen from a feed stream comprising said process fluid and one or more impurities, said method comprising:

(a) providing at least first and second vessels containing a first purifier material for adsorbing at least one of said impurities;

(b) providing at least third and fourth vessels containing a second purifier material for adsorbing impurities not removed by said first purifier material, wherein said first vessel is in series with said third vessel and said second vessel is in series with said fourth vessel;

(c) removing one or more of said impurities by flowing said feed stream through said first vessel and then flowing said feed stream through said third vessel to provide said purified process fluid, said first and third vessels being maintained at a first temperature during said removal of said impurities;

(d) regenerating said second and fourth vessels during a time when they are not purifying said feed stream by flowing a portion of said purified process fluid therethrough, said second and fourth vessels being maintained at a second temperature. Alternatively, the purifier materials can be regenerated by flowing said feed stream or a separate source of said process fluid through said purifier material at said second temperature.

This invention further comprises method of producing a purified process fluid other than hydrogen from a feed stream comprising said process fluid and one or more impurities, said method comprising:

(a) providing a first and second vessel, each vessel containing one or more regenerable purifier materials for removing at least one of said impurities from said feed stream;

(b) providing a third vessel in flow communication with both said first vessel and said second vessel, said third vessel containing a non-regenerable purifier material;

(c) removing at least one of said impurities by passing said feed stream through said first and third vessels or said second and third vessels to provide said purified process fluid, said vessels being maintained at a first temperature during said removal of said at least one of said impurities; and (d) regenerating said one or more purifier materials in said first or second vessel at a second temperature and during a time when it is not purifying said feed stream by flowing (i) a portion of said purified process fluid or (ii) said feed stream or (iii) a separate source of said process fluid therethrough.

Preferably, the second temperature used in the regeneration step in any of the methods of this invention is at least 50° C. but below a temperature that degrades the purifier materials. In certain embodiments, the fluid or feed stream used to regenerate the purifier material(s) is passed through a separate purifier material prior to use in the regeneration step.

Additional novel features of this invention shall be set forth in part in the description that follows, and in part will become apparent to those skilled in the art upon examination of the specification or may be learned by the practice of the invention. The features of the invention may further be realized and attained by means of the instrumentalities, combinations, and methods particularly pointed out in the appended claims.

BRIEF DESCRIPTION OF THE FIGURES

The accompanying drawings, which are incorporated herein and form a part of the specification, illustrate non-limiting embodiments of the present invention, and together with the description, serve to explain the principles of the invention.

In the Figures.

DETAILED DESCRIPTION OF THE INVENTION

Figure 1:
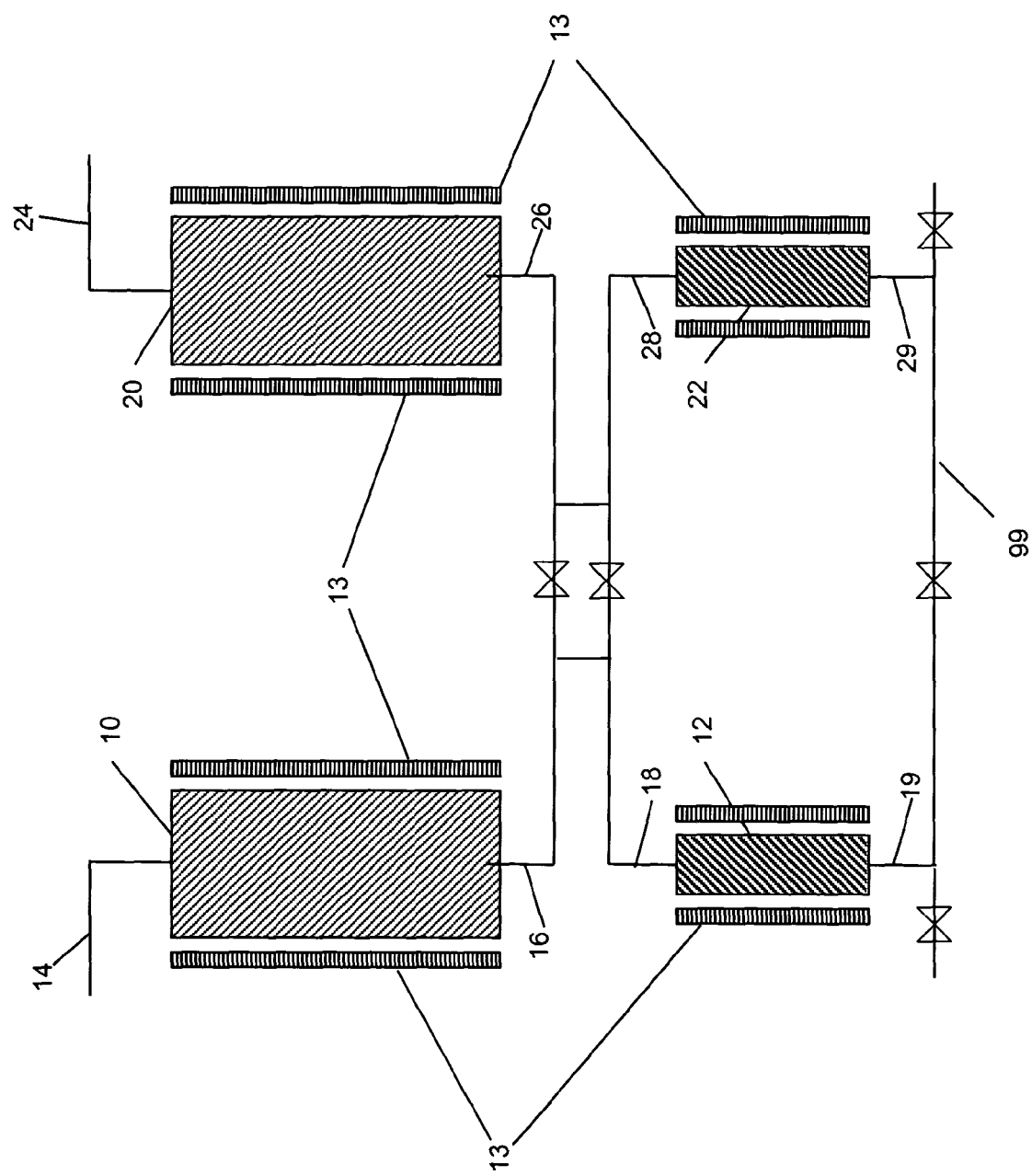
FIG. 1 is a diagram of a portion of a fluid purifier system of this invention having first and second on-line vessels containing first and second regenerable purifier materials, respectively, and first and second off-line vessels containing said first and second purifier materials, respectively.

As stated, feed streams comprising a process fluid contaminated with impurities can be purified by passing the feed stream through a purifier material that adsorbs one or more of the impurities, thereby producing a purified process gas. After a number of uses, however, the purifier material becomes spent and can no longer remove the impurities down to an acceptable level. It would be far more cost effective if the purifier material could be regenerated rather than being disposed of.

Thus, one aspect of this invention provides a method of regenerating (i.e., reactivating) a process fluid purifier material comprising flowing a purified form of said process fluid through a purifier material while heating said purifier material to a temperature of at least 50° C. but below a temperature that degrades said purifier material. That is, it was discovered that a purified form of a process fluid could effectively reactivate a spent purifier material that had been used to purify the same process fluid, thereby substantially restoring the purifier material to its original efficiency and extending the lifetime of the material's capacity. Alternatively, the purifier material can be regenerated by flowing the feed stream (comprising the process fluid and one or more impurities) through the purifier material at an elevated temperature. In yet another embodiment, the purifier material can be regenerated by flowing a separate source of the process fluid through the purifier material at an elevated temperature.

Another aspect of this invention provides a continuous method of purifying a process fluid. More specifically, one embodiment of this invention provides a continuous method of producing a purified process fluid other than hydrogen or ammonia from a feed stream comprising the process fluid and one or more impurities, said method comprising:

(a) providing at least a first and second vessel, each vessel containing one or more purifier materials for adsorbing said impurities;

(b) removing one or more of said impurities by contacting said feed stream with said purifier material by passing said feed stream through one or the other of said vessels to provide said purified process fluid, said vessels being maintained at a first temperature during said removal of said impurities; and (c) regenerating said one or more purifier materials in each of said vessels at a second temperature and during a time when they are not purifying said feed stream, said regeneration comprising flowing a portion of said purified process fluid or said feed stream or a separate source of said process fluid therethrough.

Alternatively, the purifier materials can be regenerated in step (c) by flowing the feed stream or a separate purified or unpurified source of the process fluid through the spent purifier material at an elevated temperature.

The term "regeneration" is used interchangeably herein with the term "reactivation" and refers to a means of substantially restoring the purifier material to its original efficiency and extending the lifetime of the purifier's capacity. A purifier material can be regenerated by: (1) reducing a purifier material that has undergone a chemical reaction during the purification step and/or (2) purging physisorbed impurities from the purifier material. An example of a chemical reaction is an oxidation or a reduction process reaction. For example, a purifier material might become oxidized as it reacts with impurities in a process fluid. To be regenerated, the oxidized purifier material needs to be reduced by a reducing gas during a regeneration step.

One example of a purifier material that undergoes a chemical reaction is a hydride gas purifier material. Some hydride gas purifier materials become oxidized during adsorption of contaminants as a hydride gas flows through the purifier material. In order for the oxidized purifier material to be regenerated, the purifier material must be contacted with a reducing gas that reduces the purifier material to its original state. Conventional methods of reducing gas purifier materials comprise flowing a gas such as hydrogen, nitrogen or mixtures thereof through the heated purifier vessel(s). However, the use of these auxiliary gases requires additional process gas connections, vent lines, regulators, delivery lines, storage facilities, etc. to be installed in the gas purifier system. In addition, conventional methods require purging of the purifier material to remove the process gas prior to introducing the regeneration gas, and also require time and process gas to eliminate the regeneration gas and re-equilibrate the purifier material with the process gas. The method of this invention eliminates the need for additional regenerating gases, piping, regulators, etc., by using a either the purified process fluid, the feed stream, or a separate source of the process fluid for the regeneration of the fluid purifier material used to purify the same process fluid.

This invention is applicable to the regeneration of any process fluid purifier material that undergoes a chemical reaction, including but not limited to an oxidation/reduction process (i.e., a "redox" reaction). Examples of process fluid purifier materials that undergo redox reactions include, but are not limited to, oxides and/or reduced oxides of metals such as vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, and mixtures thereof In one embodiment the metal oxides and/or reduced metal oxides are dispersed on a substrate. Examples of such substrates include, but are not limited to, alumina, amorphous silica-alumina, silica ($SiO_2$), aluminosilicate molecular sieves, titania ($TiO_2$), and zirconia ($ZrO_2$), carbon, and polymers. Other examples of purifier materials that undergo redox reactions include metal alloys, including but not limited to iron-manganese (Fe/Mn) alloys. The regeneration methods of this invention do not degrade the purifier materials during regeneration according to the methods of this invention.

The choice of purifier material will depend on the process fluid being purified and the impurities to be removed from the process fluid. Each purifier material is selected to remove specific impurities from specific matrix gases or fluids. By way of illustration, a purifier material that is capable of removing $SO_2$ impurities from a matrix gas such as NO by selecting the purifier material that can selectively remove $SO_2$ while remaining non-reactive to NO. That is, a purifier material of this invention cannot be used to remove an impurity where the "impurity" is the same gas as the matrix gas (e.g., the purifier will not remove $SO_2$ from a $SO_2$ matrix gas).

This invention is further applicable to the regeneration of purifier materials that do not undergo redox reactions but which can be regenerated with the process gas. According to this method, the process gas regenerates the purifier material by releasing or desorbing physisorbed contaminants. It was observed that the regeneration methods of this invention also do not degrade these types of purifier materials during regeneration.

As used herein, the term "process fluid" includes, but is not limited to, gases, vapors, multiphase gases, and liquid gases. Examples of process fluids that can be purified according to this invention include, but are not limited to, hydrides, hydrocarbons, halocarbons, oxides of nitrogen, halogenated fluids, sulfur-containing fluids, and amines. The term "hydride" refers to a fluid other than hydrogen that contains an active hydride moiety. Examples of hydrides include, but are not limited to, ammonia ($NH_3$), arsine ($AsH_3$), phosphine ($PH_3$), germane ($GeH_4$), silane ($SiH_4$), hydrogen sulfide, methyl silane, t-butyl arsine, t-butylphosphine, and derivatives thereof.

Examples of hydrocarbon fluids that can be purified by the methods of this invention include, but are not limited to, ethane, propane, butane, and derivatives thereof.

Examples of halocarbon fluids that can be purified by the methods of this invention include, but are not limited to, tetrafluoromethane, trifluormethane, difluoromethane, methyl fluoride, hexafluoroethane, pentafluoroethane, tetrafluoroethane, perfluoropropane, $SF_6$, and derivatives thereof.

Examples of oxides of nitrogen that can be purified by the methods of this invention include, but are not limited to, NO, $NO_2$, $N_2O$ and derivatives thereof.

Examples of halogenated fluids that can be purified by the methods of this invention include, but are not limited to, HCl, HBr, HI, $Cl_2$, $BCl_3$, $WF_6$, $BF_3$, $NF_3$, DCS, TCS, HF, and derivatives thereof.

Examples of sulfur-containing fluids that can be purified by the methods of this invention include, but are not limited to, $SO_2$, $CS_2$, COS, and derivatives thereof.

Examples of amines that can be purified by the methods of this invention include, but are not limited to, primary, secondary and tertiary substituted amines such as, but not limited to, monomethylamine, diethylamine, triethylamine and derivatives thereof.

The methods of this invention are capable of removing impurities including, but not limited to, moisture, oxygen-containing species such as carbon dioxide, carbon monoxide, oxygen, siloxanes and tetraethoxysilane (TEOS), and dopants such as germane ($GeH_4$), silane ($SiH_4$), hydrogen sulfide, nitrogen, methane, ammonia, oxides of nitrogen, halocarbons, hydrocarbons, fluorocarbons, and $FS_6$, from process fluids to provide a purified process fluid.

It is to be understood that the terms "pure," "purified" and "impure" are relative, not absolute, terms. Therefore, as used herein, "purified" gases will be defined as gases that meet the purity specifications for a given process, and "impure" gases will be defined as those gases that do not meet those purity specifications.

As stated above, conventional process fluid purifier systems use gases such as hydrogen, nitrogen or mixtures thereof to purge and regenerate the spent purifier material. However, the use of one or more of such gases requires multiple components for each purge gas (e.g., piping, valves, regulators, etc.) Further, hydrogen has the disadvantage of being classified as flammable and explosive, thus requiring additional safety precautions to be built into the system. One embodiment of this invention eliminates the need for additional regenerating gases such as hydrogen and/or nitrogen by using a portion of the purified process fluid or the feed stream to regenerate the purifier material.

Additionally, when the process fluid being purified is ammonia, the method of this invention does not require "cracking" the ammonia prior to using the ammonia process fluid as the source of fluid used to regenerate the purifier materials. More specifically, an alternative embodiment of this invention provides a continuous method of producing a purified process fluid other than hydrogen from a feed stream comprising the process fluid and one or more impurities, said method comprising:

(a) providing a first and second vessel, each vessel containing one or more regenerable purifier materials for removing at least one of said impurities from the feed stream;

(b) removing at least one of the impurities by passing the feed stream through one or the other of the vessels to provide said purified process fluid, the vessel being maintained at a first temperature during said removal of the at least one of said impurities; and (c) regenerating said one or more purifier materials in each of the vessels at a second temperature and during a time when it is not purifying said feed stream by flowing a portion of the purified process fluid or the feed stream or a separate source of the process fluid therethrough, provided that when the process fluid is ammonia, the second temperature used during regeneration is one that will decompose less than 4% or greater than 11% of the portion of purified ammonia within the vessel containing the purifier material being regenerated. That is, in this embodiment the temperature of the vessel being regenerated may be at a temperature such that less than 4% or greater that 11% of the ammonia that has entered the vessel being regenerated is decomposed to hydrogen and nitrogen after the ammonia has entered the vessel. However, the method of this invention does not include a step of decomposing the ammonia prior to introducing it into a vessel during the regeneration step.

With reference to FIG. 1, a diagram of one embodiment of a process fluid purifier system for the continuous purification of a process fluid is shown. The purifier system of FIG. 1 comprises first and second vessels 10 and 20, respectively, having at least a first purifier material contained therein for removing one or more impurities from a process fluid (the "first stage"), and third and fourth vessels 12 and 22, respectively, having at least a second purifier material contained therein for removing one or more impurities remaining in the process fluid that were not removed by the first purifier material (the "second" stage). The system shown in FIG. 1 further comprises heaters 13, feed/purge conduits 14 and 24, process/purge conduits 19 and 29, outlet conduits 16 and 26 and inlet conduits 18 and 28. It is to be understood that the schematic shown in FIG. 1 is provided to illustrate the concept of this embodiment and does not show an optimized delivery system configuration. Those skilled in the art can readily determine the necessary components for configuring a complete system of the embodiment of FIG. 1, as well as the other embodiments described herein.

In one embodiment, the system shown in FIG. 1 is a continuous system for the purification of a process fluid, wherein all purifier materials can be regenerated with (1) a purified form of the process fluid, (2) the feed stream, and/or (3) a separate source of the process fluid. In this embodiment, first and third beds 10 and 12 are on-line while second and fourth beds 20 and 22 are off-line for regeneration. A feed stream of contaminated process fluid is passed through conduit 14 into vessel 10 where one or more impurities are removed from the process fluid. The process fluid is then directed from vessel 10 and through vessel 12 via conduits 16 and 18 where one or more impurities that were not removed by the first purifier material are removed from the process fluid. The purified process fluid is then directed to a point of use, a storage container via conduit 19, and/or directed to vessel 22 via conduit 29.

During the purification process, vessels 10 and 12 (FIG. 1) are at a first temperature, which in one embodiment is ambient temperature (i.e., at about the same temperature as their surroundings). The flow of process fluid is continued until the net loading on the first and second purifier materials in vessels 10 and 12, respectively, reaches a predetermined point, that is, when it is determined that it is necessary to regenerate the purifier materials. Prior to impurity breakthrough, first and third vessels 10 and 12 are taken off-line and the feed is switched to second and fourth vessels 20 and 22 via conduit 24. Simultaneously or subsequently, the first and third vessels 10 and 12 are regenerated by raising their temperatures to a second temperature and flowing a portion of the purified process fluid through vessels 10 and 12 via conduits 14, 16, 18, 19 and 99, typically but not necessarily in a flow direction opposite that used for the adsorption or purification step.

During the regeneration step, the vessels containing the purifier material requiring regeneration are heated to a second temperature that is higher than the first temperature during the purification step. In one embodiment, the second temperature is at least 50° C. but below a temperature that would decompose the purifier material. After regeneration, vessels 10 and 12 are cooled down to the first temperature and are ready to be used in the purification step again.

In one non-limiting embodiment of the purifier system of FIG. 1, the first purifier material may be a material that is able to efficiently remove moisture, carbon dioxide, siloxanes, TEOS dopants such as $GeH_4$, $SiH_4$ and other impurities from a process fluid stream but cannot efficiently remove oxygen or other oxygen-containing species such as carbon monoxide. This first type of purifier material is typically regenerated with nitrogen in conventional systems. The second purifier material is one that can remove oxygen and other oxygen-containing species such as carbon monoxide from the process fluid stream and becomes oxidized during the purification step. This second type of purifier material is typically regenerated with hydrogen in conventional systems. In the method of this invention, both the first and second purifier materials are regenerated using a portion of the purified process fluid rather than with other gases such as hydrogen, nitrogen or mixtures thereof.

The embodiment described above using the system shown in FIG. 1 uses a portion of the purified process fluid to regenerate the purifier materials at an elevated temperature. In another embodiment of the method of this invention, the feed stream (comprising the process fluid and any impurities contained therein) can be used to regenerate the purifier materials at an elevated temperature. In yet another embodiment, a separate source of the process gas can be used to regenerate the purifier materials at an elevated temperature.

In an alternative embodiment of the purifier system shown in FIG. 1, either first and second vessels 10 and 20 or third and fourth vessels 12 and 22 comprise a non-regenerable purifier material contained therein. In this embodiment, the flow of process fluid is continued until the net loading on the first and second purifier materials in vessels 10 and 12, respectively, reaches a predetermined point, that is, when it is determined that it is necessary to regenerate the purifier materials. Prior to impurity breakthrough, first and third vessels 10 and 12 are taken off-line and the feed is switched to second and fourth vessels 20 and 22 via conduit 24. Simultaneously or subsequently, the vessel containing the regenerable material is regenerated by raising its temperatures to a second temperature and flowing a portion of the purified process fluid (or the feed stream or a separate source of the process fluid) therethrough. The vessel containing the non-regenerable purifier material is replaced with a new vessel containing fresh purifier material.

Another embodiment of a purifier system (not shown) comprises at least first and second vessels having a first purifier material contained therein, third and fourth vessels having a second purifier material contained therein, and fifth and sixth vessels having a third purifier material contained therein. In this embodiment, the first vessel is in flow communication with the third vessel which is in flow communication with the fifth vessel, and the second vessel is in flow communication with the fourth vessel which is in flow communication with the sixth vessel. That is, the purifier system of this embodiment can be considered as a dual "series" system wherein each series comprises three vessels in series and wherein one series is on-line for purification of a process fluid while the other series is off-line for regeneration of the purifier material(s) contained therein. All of the purifier materials in this embodiment may be regenerated with a purified process fluid according to the methods of this invention. In addition, this invention is not limited to systems comprising three vessels in series, but also encompasses dual "series" systems having a pair of four, five, or more vessels in series (wherein one series is on-line for purification while the other series is off-line for regeneration), wherein all of the vessels may comprise a purifier that may be regenerated with a purified process fluid.

Figure 2:
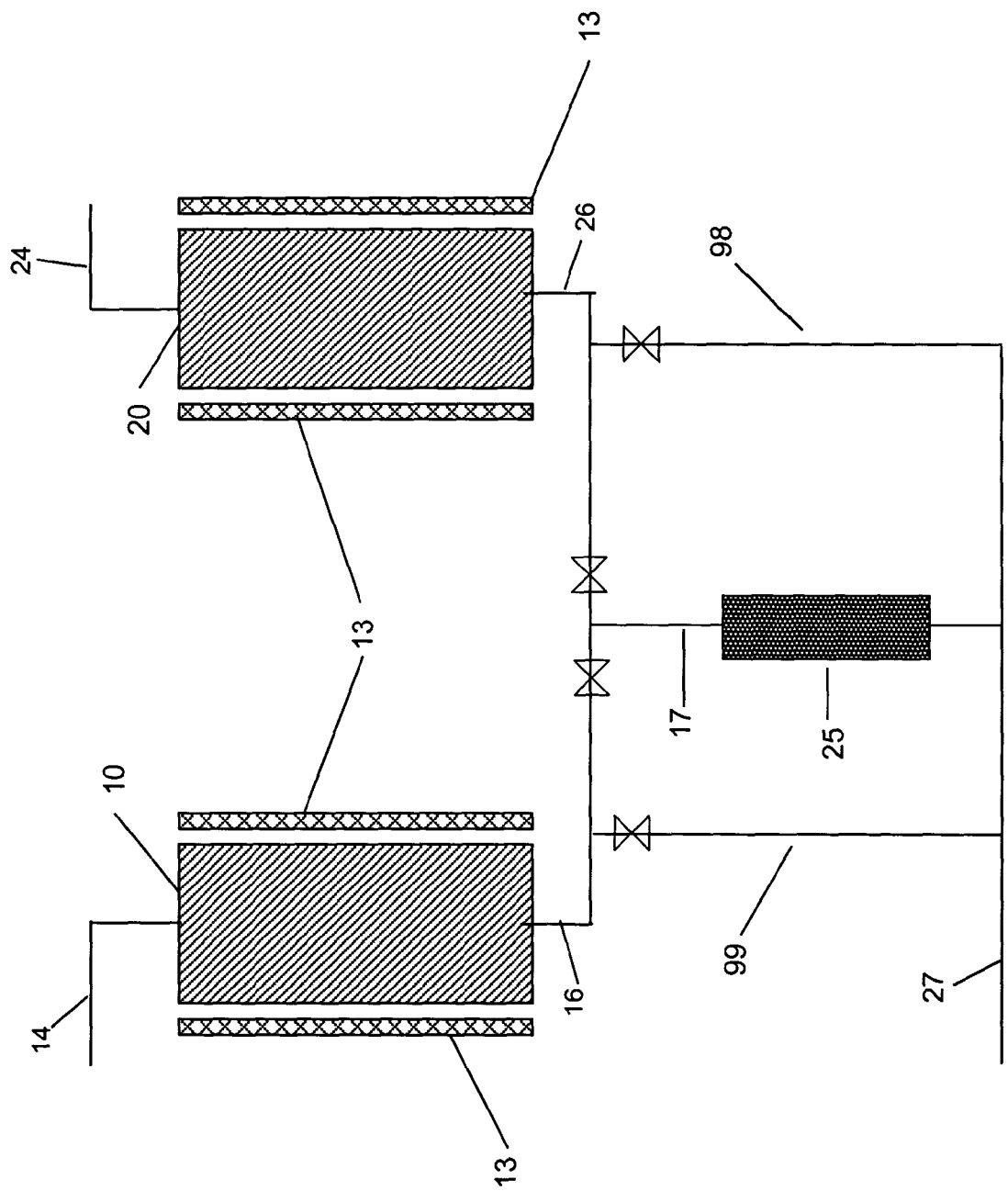
FIG. 2 is a diagram of a portion of an alternate embodiment of a fluid purifier system of this invention having an on-line vessel and an off-line vessel, wherein each vessel contains the same regenerable purifier material, and a third vessel containing a second purifier material and in flow communication with the first and second vessels.

Another embodiment of a purifier system of this invention for the purification of a process fluid is shown in FIG. 2. The purifier system in FIG. 2 comprises first and second vessels 10 and 20 containing one or more regenerable purifier materials for removing one or more impurities from a process fluid. For example, in one non-limiting embodiment vessels 10 and 20 contains one or more regenerable purifier materials that are able to efficiently remove impurities such as moisture and carbon dioxide from a process fluid stream but cannot efficiently remove oxygen. The system shown in FIG. 2 farther comprises a third vessel 25 containing a second purifier material for further purifying the process fluid by removing additional impurities not removed by the first purifier material. For example, in one non-limiting embodiment, the second purifier material is a purifier that removes oxygen from the process fluid. The purifier material contained in vessel 25 may be a regenerable material or a non-regenerable material. In the case where the second purifier material is non-regenerable, vessel 25 is removed and replaced when the second purifier material is spent. Vessel 25 is in flow communication with vessels 10 and 20 through conduits 16, 26 and 17.

In use, the first vessel 10 of FIG. 2 is on-line together with the third vessel 25, while the second bed 20 is off-line for regeneration. A feed stream of contaminated process fluid is passed through vessel 10 via conduit 14, where one or more impurities are removed from the process fluid. The process fluid is then directed through vessel 25 via conduits 16 and 17 and for removal of additional impurities from the process fluid. The purified process fluid is then directed to a point of use or a storage container through conduit 27 and/or to vessel 20 via conduits 98 and 26. The flow of process fluid is continued until the net impurity loading on the purifier material in vessel 10 reaches a predetermined point, that is, when it is determined that it is necessary to regenerate the purifier material. Prior to impurity breakthrough, the first vessel 10 is taken off-line and the feed is switched to the second vessel 20. The purification of the contaminated process fluid then proceeds as described above but using vessel 20 in conjunction with vessel 25 via conduits 17 and 26. Simultaneously or subsequently, the first vessel 10 is regenerated by raising its temperature to a second temperature and flowing a portion of the purified process fluid through vessel 10 via conduits 14, 16 and 99, typically but not necessarily in a flow direction opposite to that used for the adsorption or purification step. After regeneration, vessel 20 is cooled to about the first temperature and is ready for use in the purification step again.

The embodiment described above using the system shown in FIG. 2 uses a portion of the purified process fluid to regenerate the purifier materials at an elevated temperature. In another embodiment of the method of this invention, the feed stream (comprising the process fluid and any impurities contained therein) can be used to regenerate the regenerable purifier material at an elevated temperature. In yet another embodiment, a separate source of the process gas can be used to regenerate the regenerable purifier material at an elevated temperature.

Figure 3:
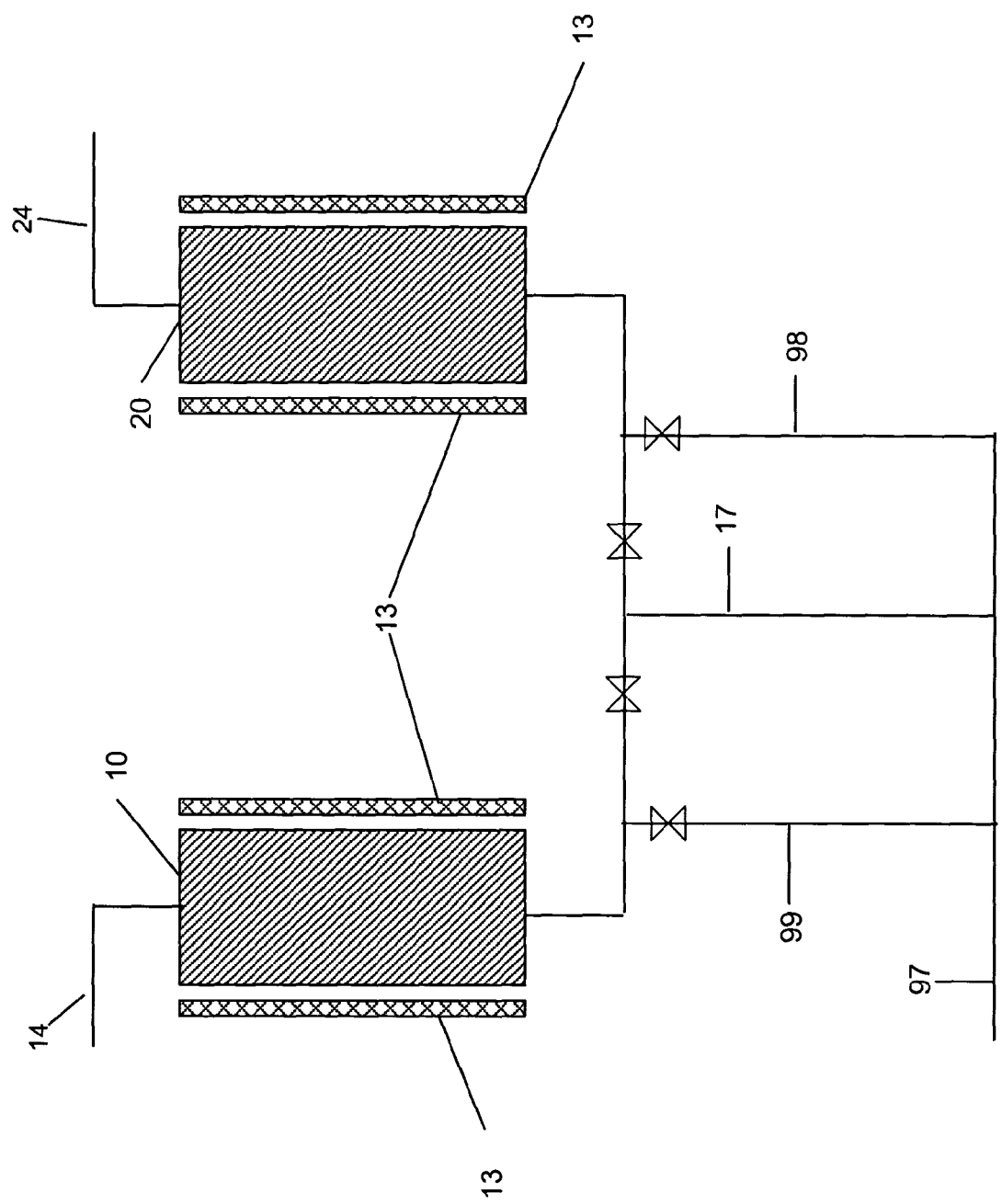
FIG. 3 is a diagram of a portion of an alternate embodiment of a fluid purifier system of this invention having an on-line vessel and an off-line vessel, wherein each vessel contains the same regenerable purifier material.

Another embodiment of a purifier system of this invention for the continuous purification of a process fluid is shown in FIG. 3. The purifier system in FIG. 3 comprises first and second vessels 10 and 20 containing a regenerable purifier material for removing one or more impurities from a process fluid. For example, in one non-limiting embodiment, vessels 10 and 20 contain a purifier material that is able to efficiently remove impurities such as moisture, carbon dioxide, and oxygen from a process fluid stream. (This type of purifier material is typically regenerated with hydrogen in conventional systems). The system shown in FIG. 3 is operated substantially as described for the system shown in FIG. 2, with the exception that a third vessel is not used to further purify the process fluid.

Figure 4:
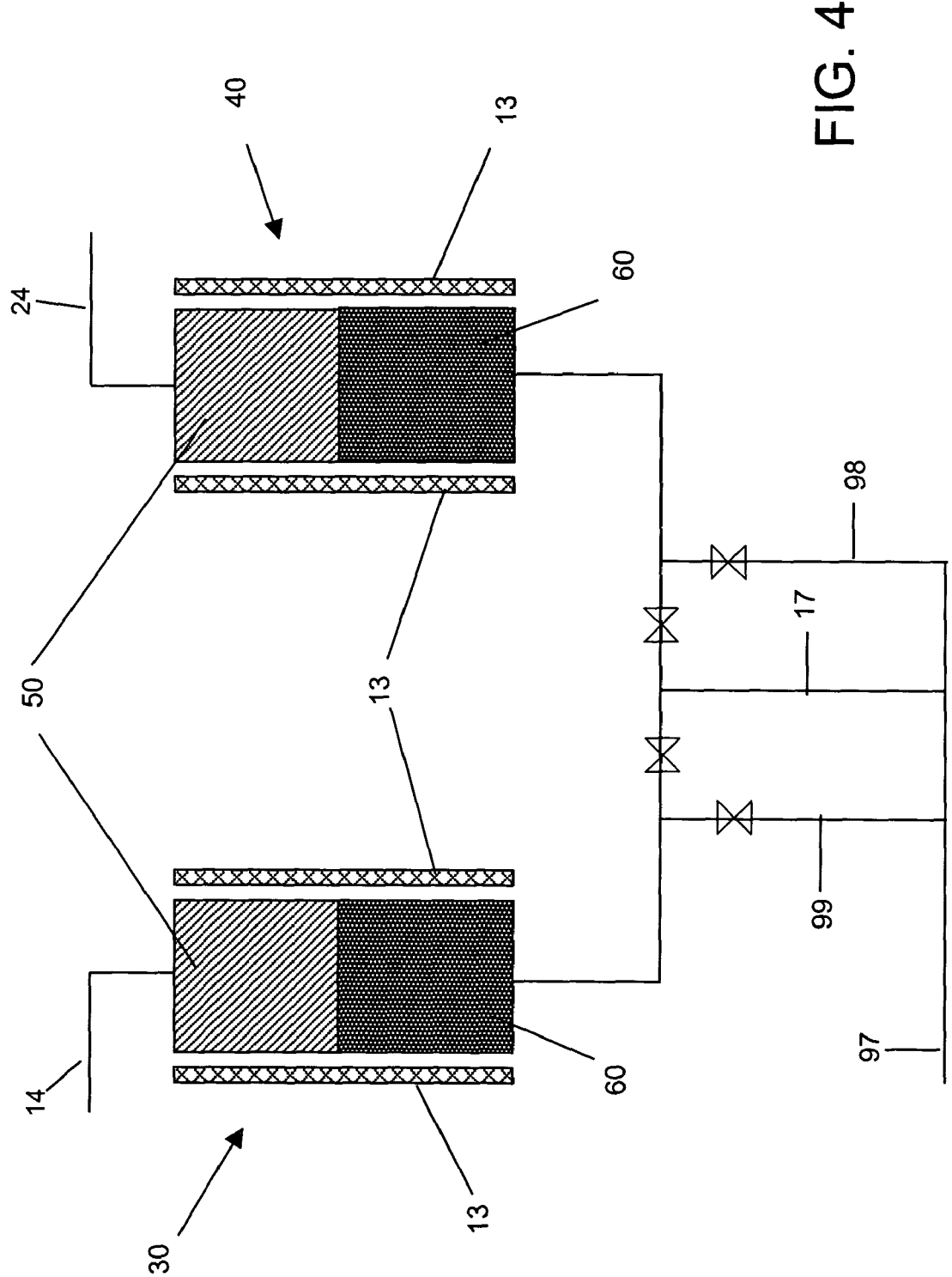
FIG. 4 is a diagram of a portion of an alternate embodiment of a fluid purifier system of this invention having an on-line vessel and an off-line vessel, wherein each vessel contains a first and second regenerable purifier material.

Another embodiment of a purifier system of this invention is shown in FIG. 4. The dual vessel system of FIG. 4 comprises first and second vessels 30 and 40, each comprising two or more types of purifier materials, each capable of removing one or more impurities from the process fluid. In one non-limiting embodiment, vessels 30 and 40 each contain a first purifier material 50 that is able to efficiently remove impurities such as moisture, carbon dioxide and other oxygen-containing species such as TEOS, and dopants such as germane, silane and hydrogen sulfide from a process fluid stream but cannot efficiently remove oxygen or carbon monoxide, and a second purifier material 60 that efficiently removes oxygen and carbon monoxide in addition to other impurities from a process fluid. Either purifier material 50 or purifier material 60 can be positioned in the downstream portion of vessels 30 and 40, or alternatively purifier materials 50 and 60 can be mixed together.

Figure 5:
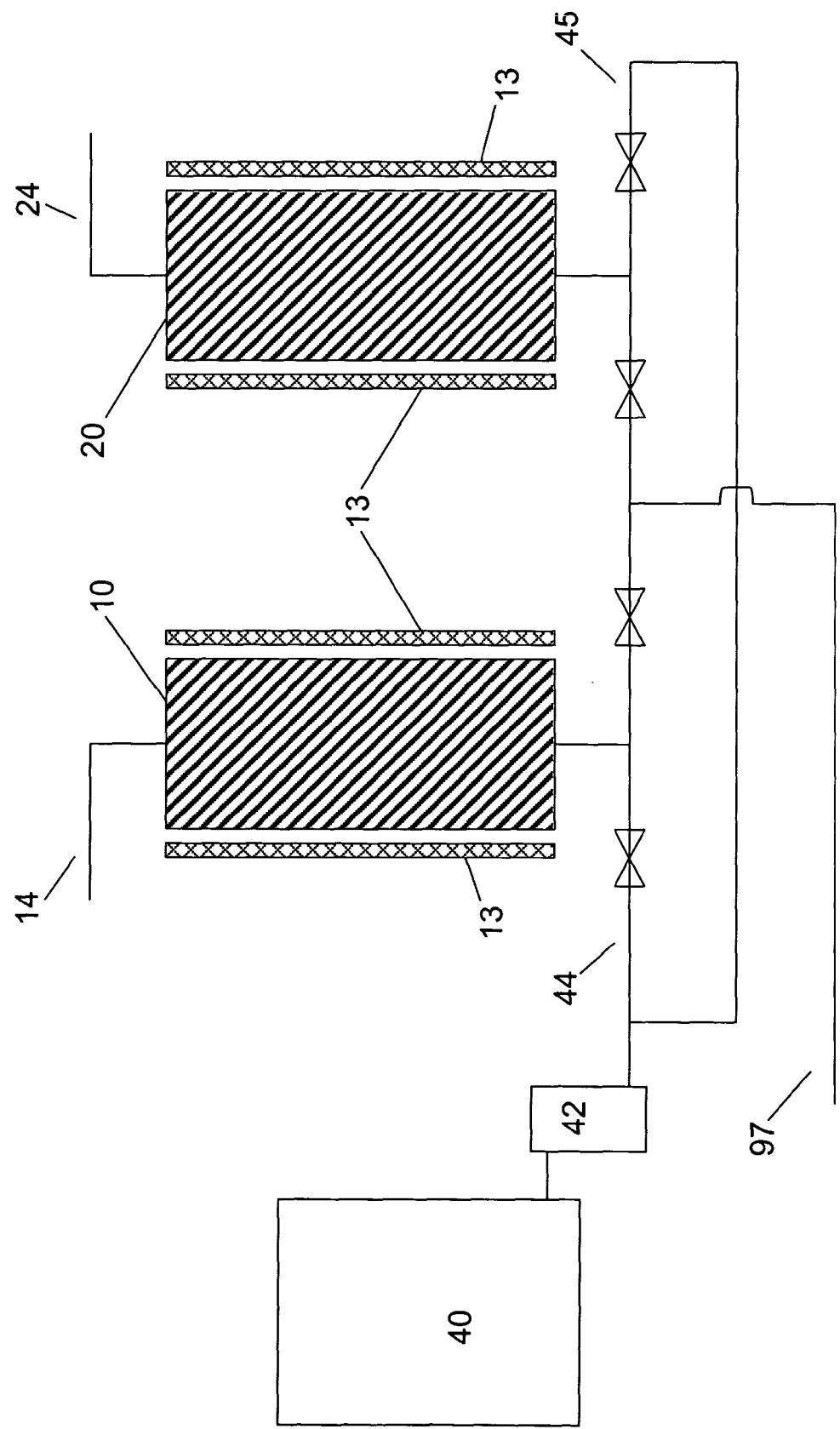
FIG. 5 is a diagram of a portion of an alternate embodiment of a fluid purifier system of this invention having an on-line vessel and an off-line vessel and a separate source of a fluid for regenerating the purifier materials in the vessels.

Another embodiment of a purifier system of this invention for the continuous purification of a process fluid is shown in FIG. 5. The dual vessel system of FIG. 5 comprises first and second vessels 10 and 20, each comprising one or more types of purifier materials, each capable of removing one or more impurities from the process fluid. The purifier system in FIG. 5 comprises additional fluid inlets 44 and 45 for use in supplying a fluid from a separate container 40 for regenerating the purifier material in these vessels. The purifier system in FIG. 5 can further include purifier material 42 for purifying the fluid from container 40 prior to use in regenerating the purifier materials in vessels 10 and 20. Alternatively, purifier 42 may be excluded or bypassed, in which case the regenerating fluid enters vessel 10 or 20 in an unpurified form. In one non-limiting embodiment, one or more types of purifier materials contained in vessel 10 are regenerated by flowing a fluid from container 40 through purifier 42 and then through conduits 44 and 14. The fluid in container 40 can either be from a separate source other than the process fluid or can be an unpurified process fluid being purified.

The use of the purified form of the process fluid and/or the feed stream as the regenerating gas in the process fluid purification systems according to the methods of this invention alleviates the problems associated with the use of hydrogen and/or nitrogen as regenerating gases. First, since additional regenerating gases (e.g., N2 and H2) are no longer required, the gas distribution systems for these gases is eliminated, thus reducing the number of components in the gas purifier system. Further, the facilities required to store and deliver these gases are eliminated. As a result, the cost of the gas purification system of this invention is significantly reduced. In addition, the safety concerns associated with the use and storage of hydrogen (e.g., flammability) are eliminated and, since the process fluid to be purified (e.g., ammonia) is already on the user's site, no review and approval from local, state, and federal regulatory agencies is necessary to operate the purifier system. In addition, as discussed above, conventional methods require purging of the purifier material to remove the process gas prior to introducing the regeneration gas, and also require time and process gas to eliminate the regeneration gas and re-equilibrate the purifier material with the process gas. The method of this invention eliminates the need for additional regenerating gases, piping, regulators, etc., by using either the purified process fluid, the feed stream, or a separate source of the process fluid for the regeneration of a fluid purifier material used to purify the same process fluid.

Furthermore, it was discovered that the purifier materials operate more efficiently and with greater capacity when the purified process fluid is used as the regenerating gas rather than hydrogen or hydrogen/nitrogen mixtures. Accordingly, fewer regenerations are required for the purifier materials, resulting in significant savings with respect to time, materials and cost of operation.

In order to illustrate the invention, the following examples are included. However, it is to be understood that these examples do not limit the invention and are only meant to suggest a method of practicing the invention. Persons skilled in the art will recognize that non-exemplified methods may be successfully performed by making routine modifications apparent to those skilled in the art.

EXAMPLES

Example 1

Figure 6:
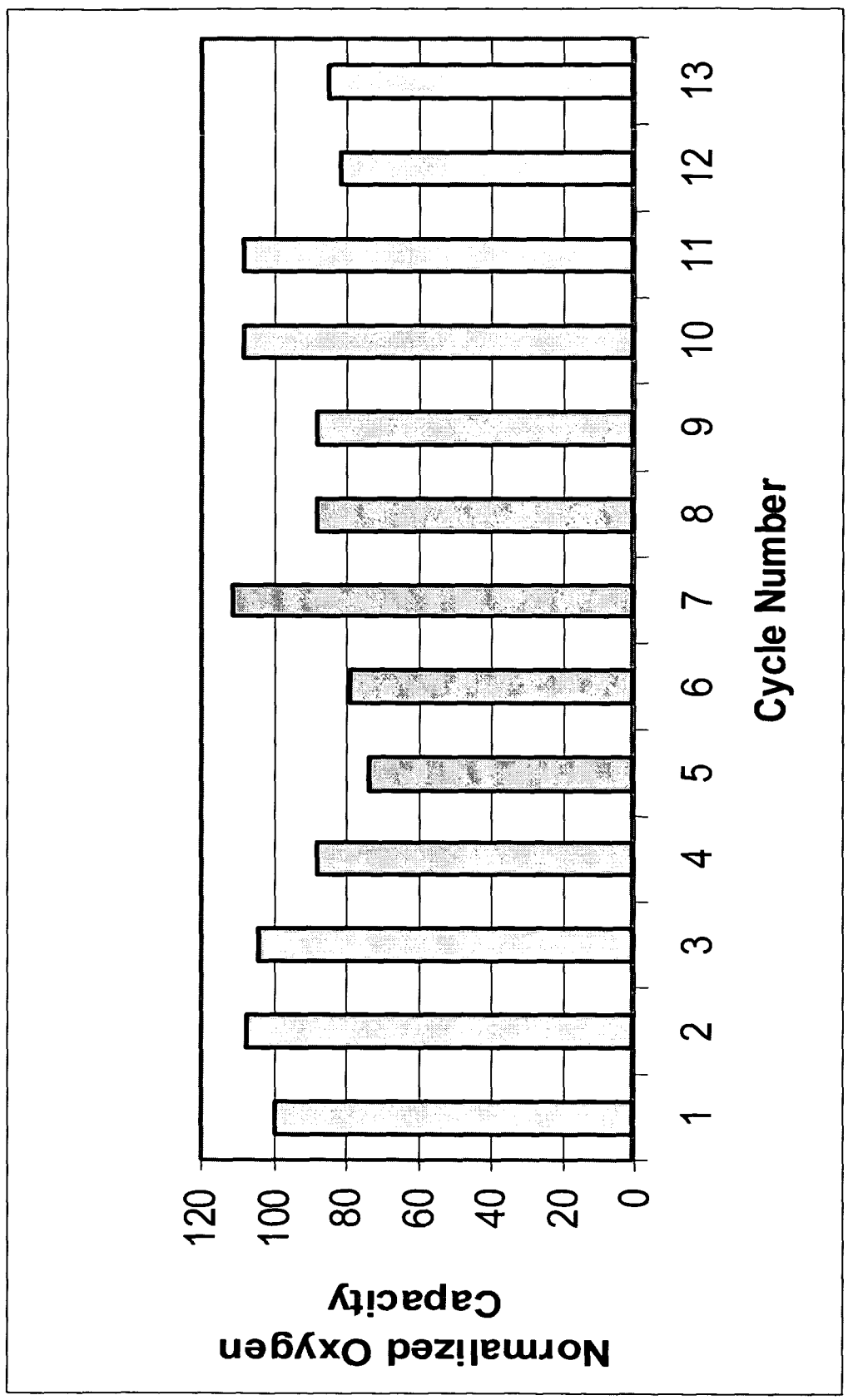
FIG. 6 is a bar graph of the normalized oxygen capacity versus cycle number for an ammonia fluid purifier regenerated with hydrogen after each purification cycle.

A purifier material was subjected to a number of regeneration cycles using hydrogen for comparison purposes. FIG. 6 is a bar graph showing the cycle life data for a purifier material comprising a metal oxide dispersed on a high surface area substrate. This purifier was regenerated in a hydrogen matrix and consumed in an ammonia matrix doped with oxygen. The bar graph provides the normalized oxygen capacity for each cycle. During the course of the regeneration experiments, the purifier is heated in hydrogen until a desired capacity is reached and then the purifier is consumed completely by contacting the purifier material with oxygen-doped ammonia. When the outlet concentration of the purifier reaches a pre-determined oxygen level, the experiment is stopped and the capacity value is recorded. This sequence of events constitutes one "cycle." The results demonstrate that the material is regenerable in hydrogen and that the purifier material is not subject to deterioration as the regeneration process continues.

Example 2

Figure 7:
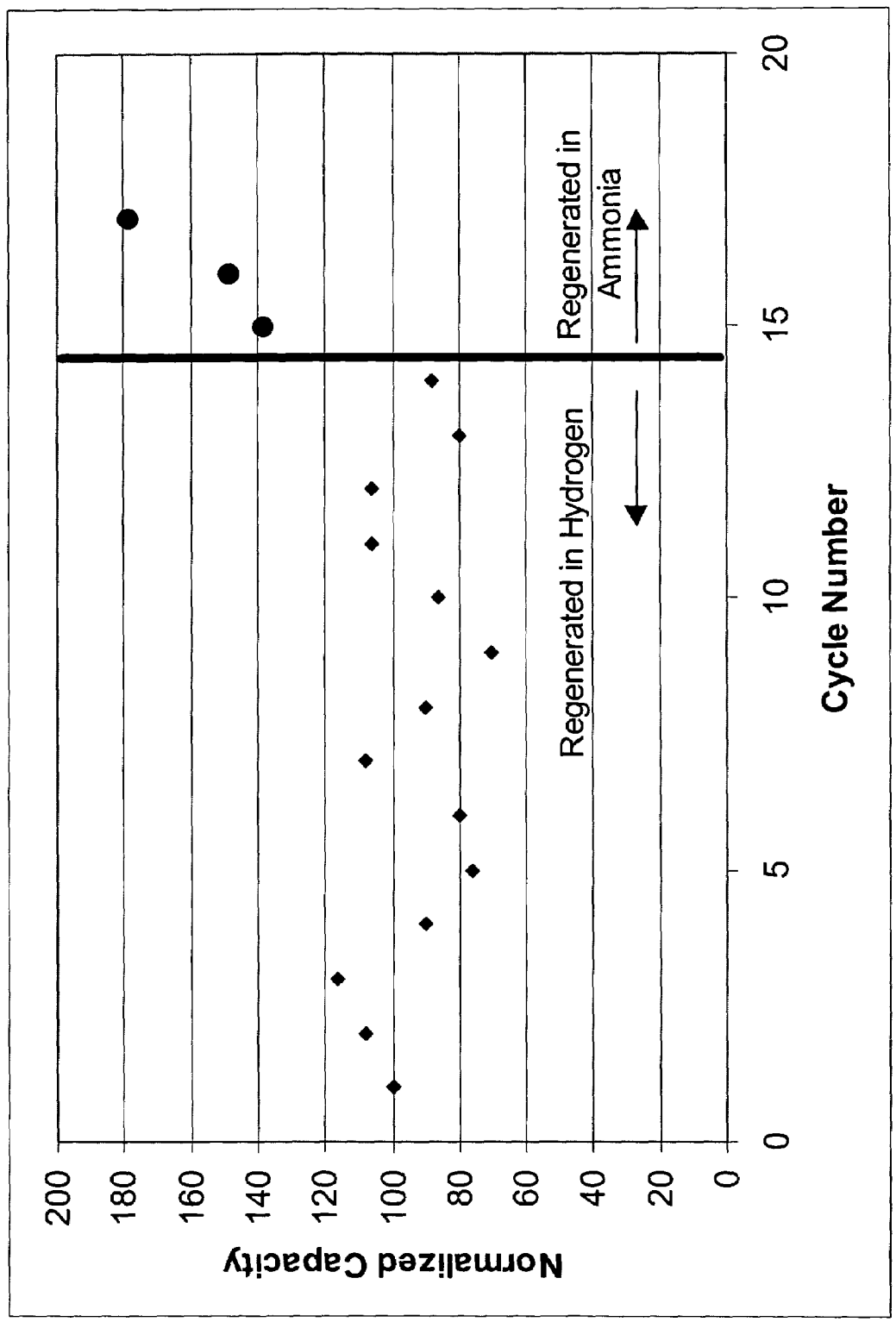
FIG. 7 is a graph of the normalized oxygen capacity versus cycle number for an ammonia fluid purifier regenerated with hydrogen for 14 cycles, followed by regeneration with purified ammonia for three subsequent cycles.

The same type of purifier material used in Example 1 was regenerated in a hydrogen matrix and consumed in an ammonia matrix doped with significant amounts of oxygen for 14 cycles. The material was then regenerated in a purified ammonia matrix and consumed in an oxygen-doped ammonia matrix for 3 cycles, keeping all other experimental parameters constant. The results, shown in FIG. 7, demonstrate that not only can the purifier material be regenerated with ammonia gas, but also that the purifier material performs better (i.e., has increased capacity) after being regenerated with ammonia gas than when it had been regenerated with hydrogen.

Example 3

Figure 8:
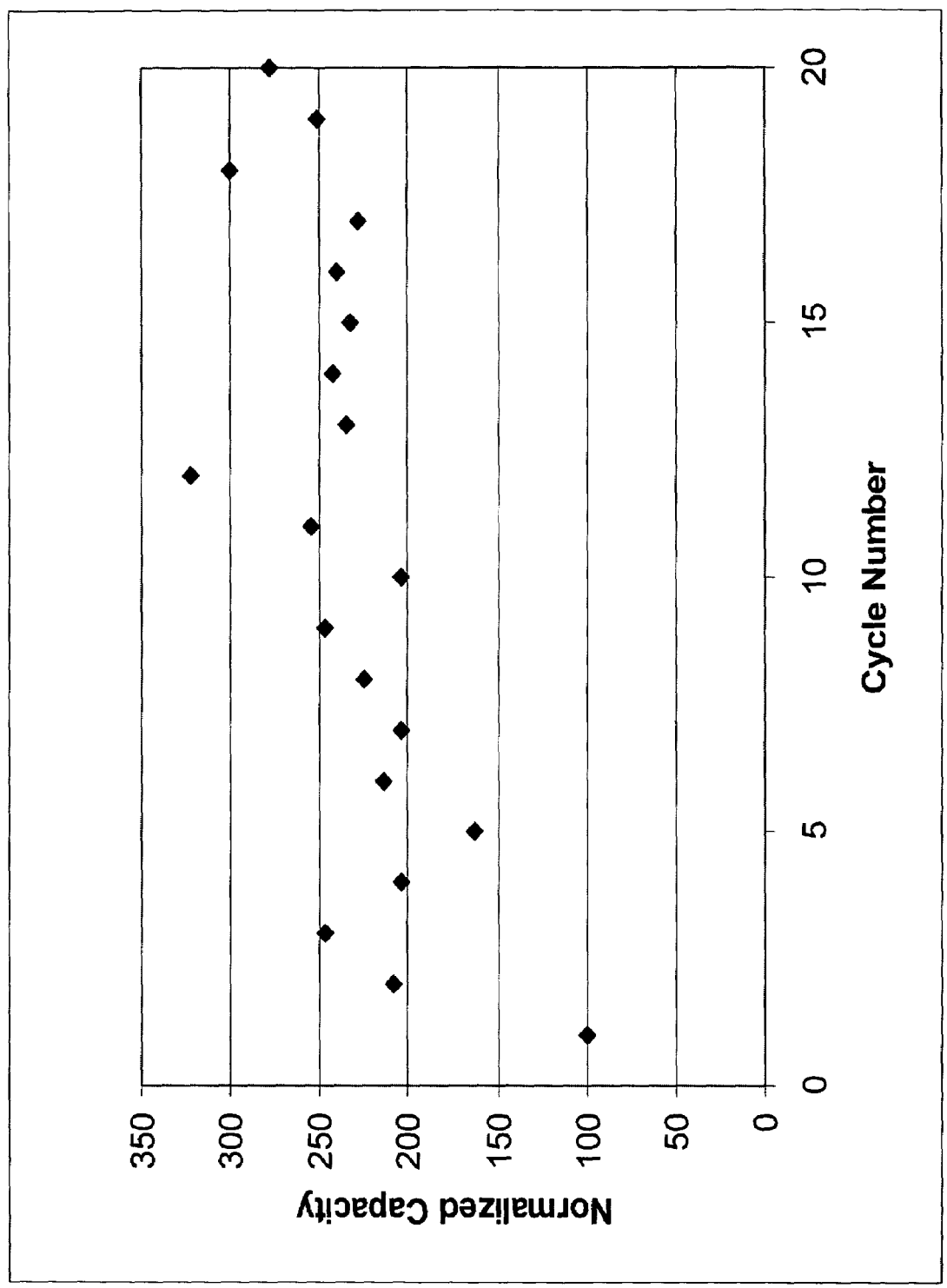
FIG. 8 is a graph of the normalized oxygen capacity versus cycle number for an ammonia fluid purifier regenerated with purified ammonia.

FIG. 8 is a graph of the normalized capacity for the same type of purifier material used in Example 1. In this example, the purifier material was regenerated solely in an ammonia matrix and consumed in an ammonia matrix doped with oxygen for 20 cycles. The results demonstrate that the purifier material can be regenerated solely with a hydride gas (such as ammonia) and that the purifier material is not subject to deterioration (i.e., the capacity is substantially completely restored) as the regeneration process with the hydride gas continues.

Example 4

Figure 9:
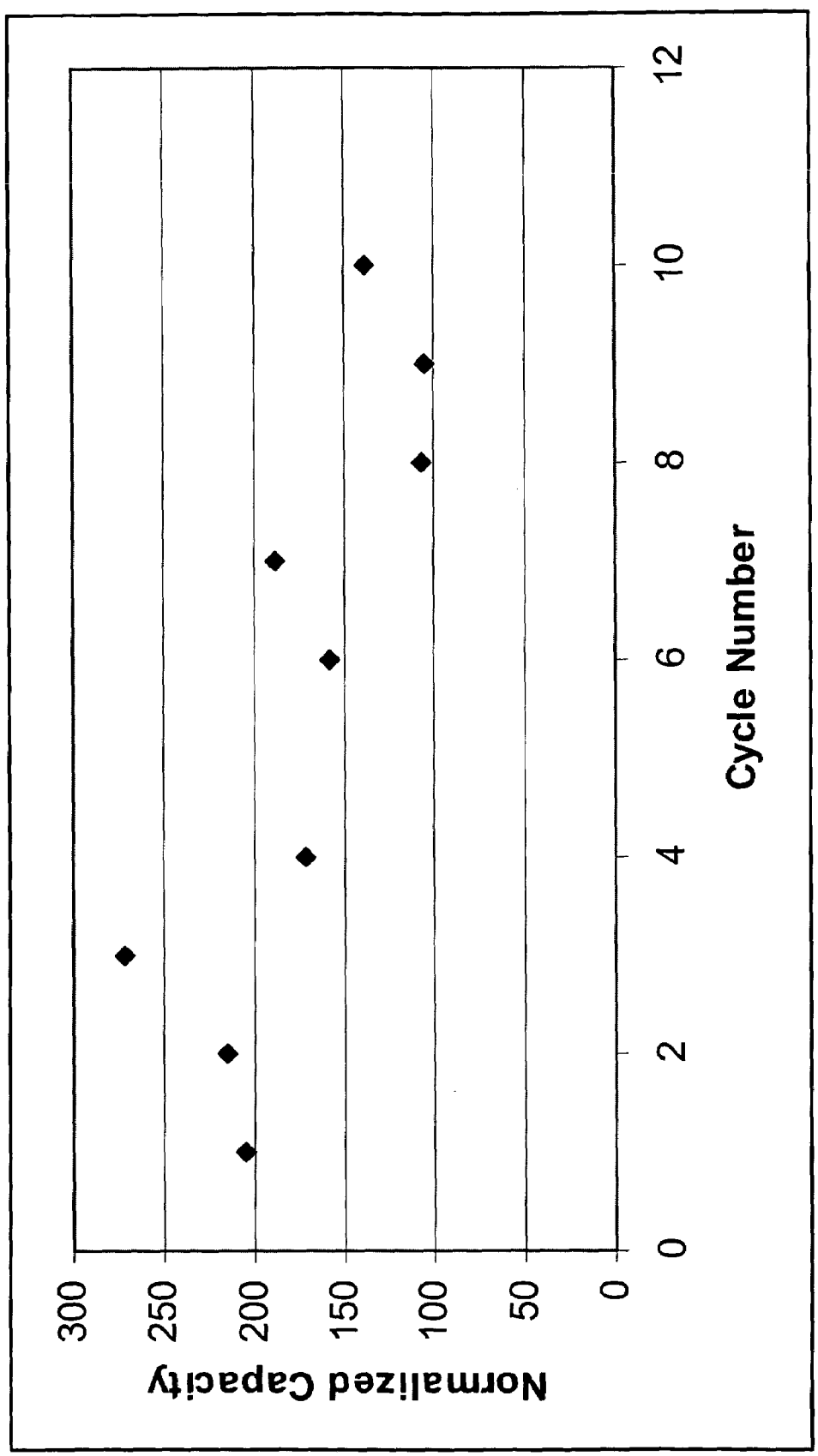
FIG. 9 is graph of the normalized moisture capacity versus cycle number for an ammonia fluid purifier regenerated with ammonia, wherein the purifier is a material that does not undergo a chemical reduction as a result of being exposed to heated ammonia.

The same type of purifier material used in Example 1 was regenerated in purified ammonia and consumed in a moisture-doped ammonia matrix for 10 cycles. FIG. 9 is a graph of the normalized moisture capacity for this purifier material. The results in FIG. 9 show that this material is regenerated by ammonia at elevated temperatures by removing physisorbed impurities such as moisture, and does not undergo a chemical reduction as a result of exposure to the reducing gas (i.e., ammonia). In addition, the results show that the purifier material does not deteriorate with increasing cycle number.

The foregoing description is considered as illustrative only of the principles of the invention. Further, since numerous modifications and changes will be readily apparent to those skilled in the art, it is not desired to limit the invention to the exact construction and process shown as described above. Accordingly, all suitable modifications and equivalents may be resorted to falling within the scope of the invention as defined by the claims that follow.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

We claim:

1. A continuous method of producing a purified process fluid other than hydrogen or ammonia from a feed stream comprising said process fluid and one or more impurities, said method comprising:
   (a) providing first and second vessels, each of said vessels containing regenerable purifier material for removing at least one of said impurities from said feed stream;
   (b) removing at least one of said impurities by passing said feed stream through one or the other of said vessels to provide said purified process fluid, said vessel operating for said removing being maintained at a first temperature during said removing of said at least one of said impurities; and
   (c) regenerating said purifier material in one of said vessels at a second temperature and during a time when it is not purifying said feed stream and when the other one of said vessels is at least partially concurrently operating to perform said removing, the regenerating including flowing (i) a portion of said purified process fluid from an outlet of said other one of said vessels or (ii) a portion of said feed stream or (iii) a separate source of said process fluid therethrough,
   wherein said feed stream or said separate source used for regeneration in step (c) is purified prior to step (c) by passing said feed stream or said separate source through a purification container positioned in-line in an inlet line for said feed stream or said separate source to said vessel to be regenerated.

2. The method of claim 1, wherein said impurities comprise moisture, carbon dioxide, siloxanes, germane, silane, hydrogen sulfide, oxygen, carbon monoxide and tetraethoxysilane.

3. The method of claim 1, wherein said regenerable purifier material comprises first and second purifier materials, wherein said first purifier material is capable of removing one or more of moisture, carbon dioxide, siloxanes, germane or silane impurities, and said second purifier material is capable of removing at least one of oxygen, carbon monoxide or tetraethoxysilane impurities.

4. The method of claim 1, wherein said second temperature is at least 50° C. but below a temperature that degrades said purifier material.

5. The method of claim 1, wherein said process fluid is a hydride, a hydrocarbon, halocarbon, an oxide of nitrogen, a halogenated fluid, a sulfur-containing fluid, or an amine.

6. The method of claim 1, wherein said purifier material is an alloy or an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

7. A continuous method of producing a purified fluid other than hydrogen from a feed stream comprising a process fluid and one or more impurities, said method comprising:
   (a) providing at least first and second vessels containing at least a first regenerable purifier material for removing at least one of said impurities from said feed stream;
   (b) providing at least third and fourth vessels containing at least a second purifier material for removing at least one of said impurities from said feed stream, wherein said first vessel is in series with said third vessel and said second vessel is in series with said fourth vessel;
   (c) removing one or more of said impurities by flowing said feed stream through said first vessel and then flowing said feed stream through said third vessel to provide a purified process fluid, said first and third vessels being maintained at a first temperature during said removing of one or more said impurities;

(d) at least partially concurrently with the removing of said one or more of said impurities, regenerating said second and fourth vessels by flowing a portion of said purified process fluid output from said third vessel, said second and fourth vessels being maintained at a second temperature higher than the first temperature during regeneration.

8. The method of claim 7, wherein said process fluid is a hydride, a hydrocarbon, halocarbon, an oxide of nitrogen, a halogenated fluid, a sulfur-containing fluid or an amine.

9. The method of claim 7, wherein at least one of said purifier materials is an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

10. The method of claim 7, wherein said impurities comprise moisture, carbon dioxide, siloxanes, germane, silane, hydrogen sulfide, oxygen, carbon monoxide and tetraethoxysilane.

11. The method of claim 7, wherein said second temperature is at least 50° C. but below a temperature that degrades said purifier materials.

12. A method of regenerating a process fluid purifier material contained in first vessel, said method comprising flowing (i) a portion of said process fluid that has been purified by flowing through a second vessel having purifier material having substantially similar composition to the process fluid purifier material contained in the first vessel or (ii) an unpurified portion of said process fluid through said purifier material while heating said purifier material to a temperature of at least 50° C. but below a temperature that degrades said purifier material by using a heater contacting the first vessel, wherein said purifier material is an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

13. The method of claim 12, wherein said process fluid is a hydride, a hydrocarbon, halocarbon, an oxide of nitrogen, a halogenated fluid, a sulfur-containing fluid or an amine.

14. The method of claim 13, wherein said hydride is ammonia.

15. The method of claim 14, wherein said temperature used during said regeneration is a temperature that will decompose less than 4% or greater that 11% of ammonia within said vessel containing said purifier material being regenerated.

16. The method of claim 12, wherein said purified portion of said process fluid or said unpurified portion of said process fluid regenerates said purifier material by desorbing physisorbed impurities from said purifier material.

17. A method of producing a purified process fluid other than hydrogen from a feed stream comprising said process fluid and one or more impurities, said method comprising:

(a) providing a first and second vessel, each vessel containing at least one regenerable purifier material for removing at least one of said impurities from said feed stream;

(b) providing a third vessel in flow communication with both said first vessel and said second vessel, said third vessel containing a non-regenerable purifier material;

(c) removing at least one of said impurities by passing said feed stream through said first and third vessels or said second and third vessels to provide said purified process fluid, said vessels being maintained at a first temperature during said removing of said at least one of said impurities; and (d) regenerating said one or more purifier materials in each of said first or second vessel at a second temperature and during a time when it is not purifying said feed stream by flowing (i) a portion of said purified process fluid or (ii) said feed stream or (iii) a separate source of said process fluid therethrough.

18. The method of claim 17, wherein said process fluid is a hydride, a hydrocarbon, halocarbon, an oxide of nitrogen, a halogenated fluid, a sulfur-containing fluid or an amine.

19. The method of claim 17, wherein said impurities comprise moisture, carbon dioxide, siloxanes, germane, silane, hydrogen sulfide, oxygen, carbon monoxide and tetraethoxysilane.

20. The method of claim 17, wherein at least one of said purifier materials is an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

21. The method of claim 17, wherein said second temperature is at least 50° C. but below a temperature that degrades said purifier materials.

22. A continuous method of producing a purified process fluid other than hydrogen from a feed stream comprising said process fluid and one or more impurities, said method comprising:

(a) providing a first and second vessel, each vessel containing at least one regenerable purifier material for removing at least one of said impurities from said feed stream;

(b) removing at least one of said impurities by passing said feed stream through one or the other of said vessels to provide said purified process fluid, said vessel being maintained at a first temperature during said removing of said at least one of said impurities; and (c) regenerating said one or more purifier materials in each of said vessels at a second temperature and during a time when it is not purifying said feed stream by flowing (i) a portion of said purified process fluid or (ii) said feed stream or (iii) a separate source of said process fluid therethrough, provided that when said process fluid is ammonia, said second temperature used during said regeneration is a temperature that will decompose less than 4% or greater that 11% of ammonia in the purified process fluid within said vessel containing said purifier material being regenerated.

23. The method of claim 22, wherein said process fluid is a hydride, a hydrocarbon, halocarbon, an oxide of nitrogen, a halogenated fluid, a sulfur-containing fluid, or an amine.

24. The method of claim 22, wherein said impurities comprise moisture, carbon dioxide, siloxanes, germane, silane, hydrogen sulfide, oxygen, carbon monoxide and tetraethoxysilane.

25. The method of claim 22, wherein at least one of said purifier materials is an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

26. The method of claim 23, wherein said second temperature is at least 50° C. but below a temperature that degrades said purifier materials.

27. The method of claim 23, wherein said halogenated fluid is selected from the group of fluids consisting of HCl, HBr, HI, $Cl_2$, $BCl_3$, $WF_6$, $BF_3$, $NF_3$, DCS, TCS, HF, and derivatives thereof.

28. The method of claim 5, wherein said halogenated fluid is selected from the group of fluids consisting of HCl, HBr, HI, $Cl_2$, $BCl_3$, $WF_6$, $BF_3$, $NF_3$, DCS, TCS, HF, and derivatives thereof.

29. The method of claim 13, wherein said halogenated fluid is selected from the group of fluids consisting of HCl, HBr, HI, $Cl_2$, $BCl_3$, $WF_6$, $BF_3$, $NF_3$, DCS, TCS, HF, and derivatives thereof.

30. A continuous method of producing a purified process fluid other than hydrogen or ammonia from a feed stream comprising said process fluid and one or more impurities, said method comprising:
(a) providing first and second vessels, each of said vessels containing regenerable purifier material for removing at least one of said impurities from said feed stream;
(b) removing at least one of said impurities by passing said feed stream through one or the other of said vessels to provide said purified process fluid, said vessel operating for said removing being maintained at a first temperature during said removing of said at least one of said impurities; and
(c) regenerating said purifier material in one of said vessels at a second temperature and during a time when it is not purifying said feed stream and when the other one of said vessels is at least partially concurrently operating to perform said removing, the regenerating including flowing (i) a portion of said purified process fluid from an outlet of said other one of said vessels or (ii) a portion of said feed stream or (iii) a separate source of said process fluid therethrough,
wherein said regenerable purifier material comprises first and second purifier materials, wherein said first purifier material is capable of removing one or more of moisture, carbon dioxide, siloxanes, germane or silane impurities, and said second purifier material is capable of removing at least one of oxygen, carbon monoxide or tetraethoxysilane impurities.

31. The method of claim 30, wherein said process fluid is a hydride, a hydrocarbon, halocarbon, an oxide of nitrogen, a halogenated fluid, a sulfur-containing fluid, or an amine.

32. A continuous method of producing a purified process fluid other than hydrogen or ammonia from a feed stream comprising said process fluid and one or more impurities, said method comprising:
(a) providing first and second vessels, each of said vessels containing regenerable purifier material for removing at least one of said impurities from said feed stream;
(b) removing at least one of said impurities by passing said feed stream through one or the other of said vessels to provide said purified process fluid, said vessel operating for said removing being maintained at a first temperature during said removing of said at least one of said impurities; and
(c) regenerating said purifier material in one of said vessels at a second temperature and during a time when it is not purifying said feed stream and when the other one of said vessels is at least partially concurrently operating to perform said removing, the regenerating including flowing (i) a portion of said purified process fluid from an outlet of said other one of said vessels or (ii) a portion of said feed stream or (iii) a separate source of said process fluid therethrough,
wherein said process fluid is a hydride, a hydrocarbon, halocarbon, an oxide of nitrogen, a halogenated fluid, a sulfur-containing fluid, or an amine.

33. The method of claim 32, wherein said second temperature is at least 50° C. but below a temperature that degrades said purifier material and wherein said purifier material is an alloy or an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

34. A continuous method of producing a purified process fluid other than hydrogen or ammonia from a feed stream comprising said process fluid and one or more impurities, said method comprising:
(a) providing first and second vessels, each of said vessels containing regenerable purifier material for removing at least one of said impurities from said feed stream;
(b) removing at least one of said impurities by passing said feed stream through one or the other of said vessels to provide said purified process fluid, said vessel operating for said removing being maintained at a first temperature during said removing of said at least one of said impurities; and
(c) regenerating said purifier material in one of said vessels at a second temperature and during a time when it is not purifying said feed stream and when the other one of said vessels is at least partially concurrently operating to perform said removing, the regenerating including flowing (i) a portion of said purified process fluid from an outlet of said other one of said vessels or (ii) a portion of said feed stream or (iii) a separate source of said process fluid therethrough,
wherein said purifier material is an alloy or an oxide of vanadium, molybdenum, antimony, bismuth, tin, cerium, chromium, cobalt, copper, tungsten, iron, manganese, nickel, zirconium, hafnium, niobium, tantalum, technetium, osmium, rhodium, iridium, silver, cadmium, mercury, or mixtures thereof.

35. The method of claim 34, wherein said impurities comprise moisture, carbon dioxide, siloxanes, germane, silane, hydrogen sulfide, oxygen, carbon monoxide and tetraethoxysilane and wherein said second temperature is at least 50° C. but below a temperature that degrades said purifier material.

36. A method of regenerating a process fluid purifier material contained in first vessel, said method comprising flowing (i) a portion of said process fluid that has been purified by flowing through a second vessel having purifier material having substantially similar composition to the process fluid purifier material contained in the first vessel or (ii) an unpurified portion of said process fluid through said purifier material while heating said purifier material to a temperature of at least 50° C. but below a temperature that degrades said purifier material by using a heater contacting the first vessel,
wherein said process fluid is a hydride, a hydrocarbon, halocarbon, an oxide of nitrogen, a halogenated fluid, a sulfur-containing fluid or an amine.

37. The method of claim 36, wherein said hydride is ammonia and wherein said temperature used during said regeneration is a temperature that will decompose less than 4% or greater that 11% of ammonia within said vessel containing said purifier material being regenerated.

* * * * *